May 3, 1938.  T. NIBLETT  2,115,743
INTERLOCKING ASSEMBLY
Filed May 14, 1937  2 Sheets-Sheet 1

Inventor
Thomas Niblett
By Clarence A. O'Brien
Hyman Berman
Attorneys

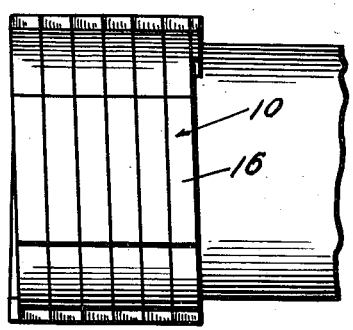
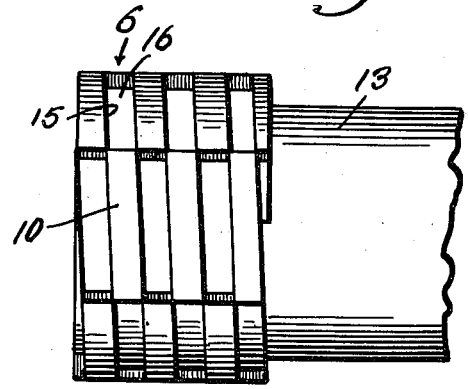
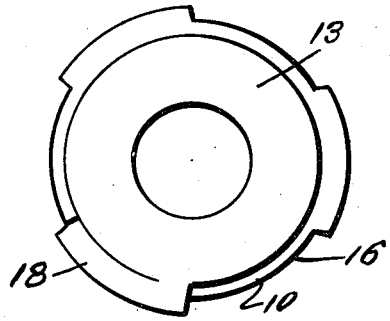
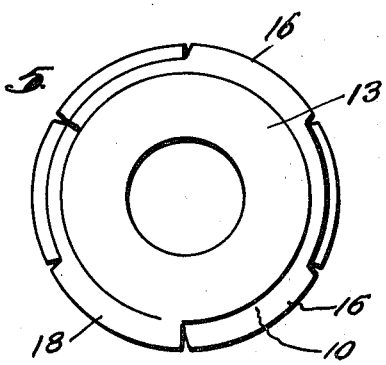
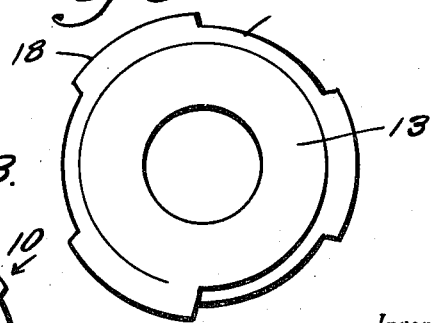
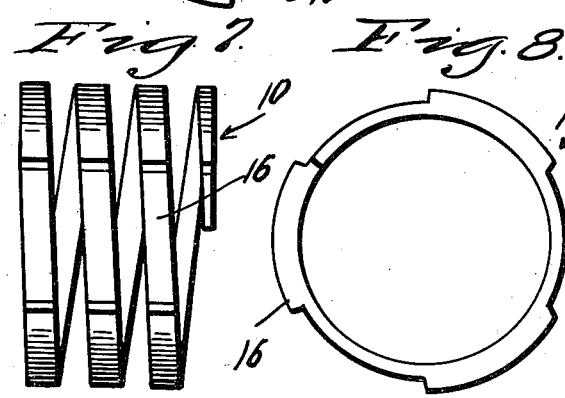

Patented May 3, 1938

2,115,743

UNITED STATES PATENT OFFICE 2,115,743

INTERLOCKING ASSEMBLY

Thomas Niblett, Carvel Beach, Curtis Bay, Md.

Application May 14, 1937, Serial No. 142,713

1 Claim. (Cl. 285—149)

This invention appertains to new and useful improvements in interlocking connectors for various uses, such for instance as breech locks on large ordnance.

The principal object of the present invention is to provide an interlocking connector of the character stated which will be more force-resistible than structures of this character now in general use.

Another important object of the invention is to provide a more efficient interlocking assembly of the character stated which will be of low cost to manufacture and which will not be susceptible to the ready development of defects.

These and various other important objects and advantages of the invention will become apparent to the reader of the following specification.

In the drawings:—

Figure 1 represents a fragmentary longitudinal sectional view showing the male and female units assembled.

Figure 2 is a side elevational view of the male element with the helical element in unlocked position.

Figure 3 is a fragmentary side elevational view of the male unit with the helix in locking position.

Figure 4 is an end elevational view of the male unit with the helix in open position.

Figure 5 is an end elevational view of the male unit with the helix in closed position.

Figure 6 is an end elevational view of the male unit with the helix removed.

Figure 8 is an end elevational view of the helix.

Figure 9:
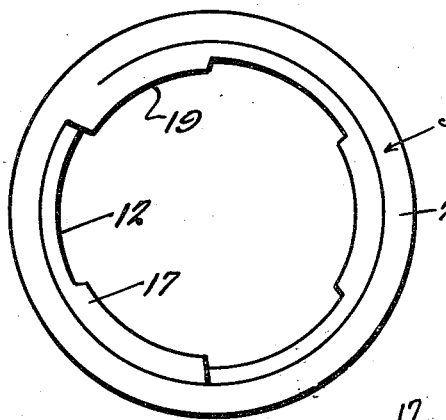
Figure 9 is an end elevational view of the female unit with its helix in unlocked position.

Referring to the drawings wherein like numerals designate like parts, it can be seen that numeral 5 generally refers to the female unit while numeral 6 generally refers to the male unit.

Let it be assumed that the element 7 represents the breech end of a gun. This end of the gun is counterbored as at 8 and this counterbore is formed with a spiral grooveway 9. Threaded into this grooveway 9 is a helix such as is generally referred to by numeral 10 in Figure 7. This helix is made from preferably square or rectangular cross sectional spring rod material and in the instance of the unit 5 the inner surface of the convolutions are cut back at 120 degree intervals so that they are capable of registering with the longitudinally extending grooveways which are formed in the wall of the bore 8 and intersect the spiral grooveway 9.

Figure 10:
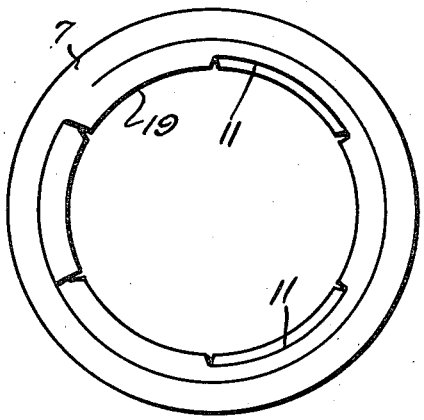
Figure 10 is an end elevational view of the female unit with the helix in locking position.

These set back portions are denoted by reference character 12 in Figure 9 and in this figure the cut back portions 12 are shown aligned with the channels 11. Figure 10 shows these set back portions 12 in offset relation with respect to the channels 11, this being the locking position of the helix with respect to the construction at the inside of the barrel 7.

The male unit 6 is constructed in a somewhat similar manner. As can be seen in Figure 6, the body 13 of the unit 6 which is to be inserted into the barrel 7 is formed with longitudinally extending channels 14 at 120 degree intervals around the body 13, these channels 14 intersecting a spiral grooveway formed in the insertable end of the body 13. The grooveway is denoted by numeral 15.

Figure 7:
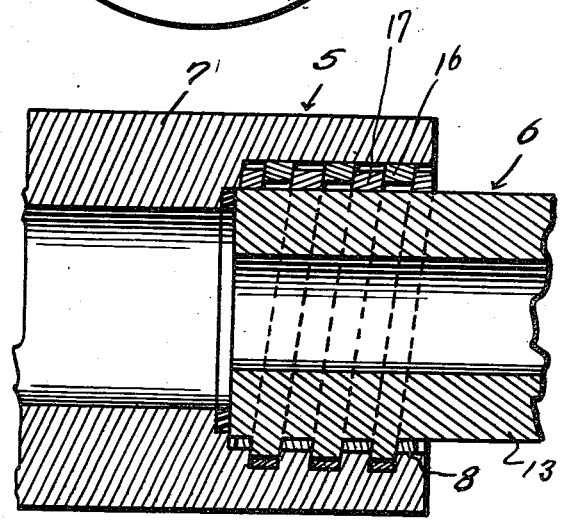
Figure 7 is a side elevational view of the helix.
Figure 11:
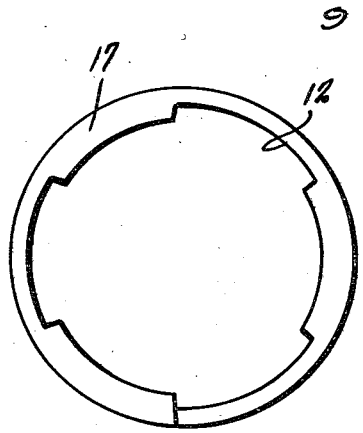
Figure 11 is an end elevational view of the female unit with the helix removed.

A helix such as is shown in Figure 7 and constructed in substantially the same manner, but instead of having the set back portions 12 of the helix shown in Figure 11 for the female unit 5, has the set back portions or reducements 16 on its outer surface. The helix shown in Figure 7 is constructed of substantially the same material as the helix 17 for the female unit and is threaded through the groove 15 of the body 13, with its reducement 16 at 120 degree intervals around its convolutions so that its reducements are capable of matching or registering with the longitudinal channels 14 of the body 13.

In assembling these two units 5—6 the reducements 12 of the helix 17 are brought to register with the channels 11 of the body 7 of the female unit, and the reducements 16 of the helix 10 are brought to register with the channels 14 of the body 13.

The channels 14 of the body 13 and the reducements 16 of the helix 10 are now free to receive the projecting portions of the helix 17 and wall of the bore 8, while the registering channels 11 and reducements 12 of the helix 17 are free to receive the outstanding portions of the unit 6.

With the male unit 6 thus inserted into the female unit 5, a 120 degree rotation of the male element 6 will cause the risers 18 of the body 13 to push the female unit helix 17, while the helix 10 of the male unit 6 will be caused to slip on the body 13 by reason of its abutment with the risers 19 on the wall of the bore 8. Thus the helical members and grooveways of the male and female units will be brought into interlocked relation without any pockets existing throughout the entire connection as will be found in breech lock means of the mutilated thread type.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

A connector of the character described comprising a female unit provided with a spiral grooveway therein, longitudinally extending channels intersecting the grooveway, a helical member threaded into the said grooveway and having reducements at the inner side of its convolutions, a male unit provided with a spiral grooveway thereon, longitudinally extending channels on the male unit intersecting the said spiral grooveway, and a helical member threaded into the said spiral grooveway of the male unit and provided with reduced portions at the outer side of its convolutions.

THOMAS NIBLETT.